United States Patent [19]

Burkhardt et al.

[11] 4,254,399
[45] Mar. 3, 1981

[54] PROCESS FOR AUTOMATIC PATTERN EVALUATION WITH THE AID OF A RAPID IMAGE PROCESSING AND CIRCUIT FOR CARRYING OUT THE PROCESS

[75] Inventors: Hans Burkhardt, Karlsruhe; Walter Metzdorff, Friedrichshafen; Holger Schütte, Stetten, all of Fed. Rep. of Germany

[73] Assignee: Dornier GmbH, Fed. Rep. of Germany

[21] Appl. No.: 23,956

[22] Filed: Mar. 26, 1979

[51] Int. Cl.³ ............................................. G06K 9/56
[52] U.S. Cl. ......................... 340/146.3 MA; 364/515; 364/725
[58] Field of Search ............ 340/146.3 MA, 146.3 H, 340/146.3 AC, 146.3 R; 364/515, 725, 726, 727

[56] References Cited

U.S. PATENT DOCUMENTS

| | | |
|---|---|---|
| 3,597,731 | 8/1971 | Reitboeck et al. ............ 340/146.3 H |
| 3,701,095 | 10/1972 | Yamaguchi et al. ...... 340/146.3 MA |
| 3,879,605 | 4/1975 | Carl et al. ................. 340/146.3 MA |
| 4,005,385 | 1/1977 | Joynson et al. ........... 340/146.3 MA |
| 4,167,728 | 9/1979 | Sternberg ............................. 364/515 |

*Primary Examiner*—Leo H. Boudreau
*Attorney, Agent, or Firm*—James E. Bryan

[57] ABSTRACT

A circuit is described which makes use of a mathematical transformation based solely on AND and OR connections for the purpose of recognizing patterns, and a process for localizing this pattern within a zone or range. By means of the direct connection of AND and OR gates, a completely parallel processing of each individual bit is achieved in the arithmetic and logic unit so implemented, which signifies a fraction of the processing time as compared to full adders. Simultaneously the equipment is capable of recognizing a specific pattern (object) from a multitude of mutually nested structures (neighborhood) and to localize it by a subsequent procedure.

2 Claims, 14 Drawing Figures

SIGNAL FLUX DIAGRAM OF THE INVENTIVE ONE-DIMENSIONAL TRANSFORMATION

SIGNAL FLUX DIAGRAM OF THE INVENTIVE ONE-DIMENSIONAL TRANSFORMATION

WIRING DIAGRAM OF THE INVENTIVE ONE-DIMENSIONAL TRANSFORMATION (N=8)

WIRING DIAGRAM OF THE CONNECTION OF TWO PATTERN ELEMENTS WITH A RESOLUTION OF 6 BITS

BASIC SIGNAL FLUX DIAGRAM OF THE INVENTIVE TWO-DIMENSIONAL TRANSFORMATION

A PART OF THE WIRING DIAGRAM OF THE INVENTIVE TWO-DIMENSIONAL TRANSFORMATION (BASED UPON 8x8 PATTERN ELEMENTS)

$$\underline{X} = \begin{matrix} 0 & 0 & 0 & 0 & 0 & 0 & 0 & 0 \\ 0 & 0 & 1 & 1 & 0 & 0 & 0 & 0 \\ 0 & 1 & 1 & 1 & 1 & 0 & 0 & 0 \\ 0 & 0 & 1 & 1 & 0 & 0 & 0 & 0 \\ 0 & 0 & 0 & 1 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{matrix}$$

$$\underline{\tilde{X}} = \begin{matrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 1 \\ 0 & 0 & 0 & 0 & 0 & 0 & 0 & 1 \\ 0 & 0 & 0 & 0 & 0 & 0 & 0 & 1 \\ 0 & 0 & 0 & 0 & 0 & 0 & 1 & 1 \\ 0 & 0 & 0 & 1 & 1 & 1 & 1 & 1 \end{matrix}$$

(a)

$$\underline{X} = \begin{matrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 1 & 0 & 0 \\ 0 & 0 & 0 & 0 & 1 & 1 & 1 & 0 \\ 0 & 0 & 0 & 1 & 1 & 1 & 1 & 1 \\ 0 & 0 & 0 & 0 & 0 & 1 & 0 & 0 \\ 0 & 0 & 0 & 0 & 0 & 1 & 0 & 0 \\ 0 & 0 & 0 & 0 & 0 & 0 & 0 & 0 \end{matrix}$$

$$\underline{\tilde{X}} = \begin{matrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 1 \\ 0 & 0 & 0 & 0 & 0 & 0 & 0 & 1 \\ 0 & 0 & 0 & 0 & 0 & 0 & 0 & 1 \\ 0 & 0 & 0 & 0 & 0 & 1 & 1 & 1 \\ 0 & 0 & 0 & 1 & 1 & 1 & 1 & 1 \end{matrix}$$

(b)

EXAMPLE FOR A BINARY PATTERN (a), DISPLACED IN BOTH DIRECTIONS (b) AND THE COORDINATED UNINFLUENCED RESULT COEFFICIENTS $\underline{\tilde{X}}$

FIG. 6

$$\underline{X} = \begin{matrix} 0 & 0 & 1 & 0 & 0 & 0 & 0 & 0 \\ 0 & 0 & 2 & 0 & 0 & 0 & 0 & 0 \\ 1 & 2 & 3 & 2 & 1 & 0 & 0 & 0 \\ 0 & 0 & 2 & 0 & 0 & 0 & 0 & 0 \\ 0 & 0 & 1 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{matrix}$$

$$\underline{\tilde{X}} = \begin{matrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 1 \\ 0 & 0 & 0 & 0 & 0 & 0 & 0 & 2 \\ 0 & 0 & 0 & 0 & 0 & 0 & 0 & 3 \\ 0 & 0 & 0 & 0 & 0 & 0 & 0 & 2 \\ 0 & 0 & 0 & 1 & 0 & 3 & 2 & 3 \end{matrix}$$

(a)

$$\underline{X} = \begin{matrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 1 & 0 & 0 \\ 0 & 0 & 0 & 0 & 0 & 2 & 0 & 0 \\ 0 & 0 & 0 & 1 & 2 & 3 & 2 & 1 \\ 0 & 0 & 0 & 0 & 0 & 2 & 0 & 0 \\ 0 & 0 & 0 & 0 & 0 & 1 & 0 & 0 \\ 0 & 0 & 0 & 0 & 0 & 0 & 0 & 0 \end{matrix}$$

$$\underline{\tilde{X}} = \begin{matrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 1 \\ 0 & 0 & 0 & 0 & 0 & 0 & 0 & 2 \\ 0 & 0 & 0 & 0 & 0 & 0 & 0 & 3 \\ 0 & 0 & 0 & 0 & 0 & 0 & 0 & 2 \\ 0 & 0 & 0 & 1 & 0 & 3 & 2 & 3 \end{matrix}$$

(b)

EXAMPLE FOR A GREY-STAGE PATTERN (a), DISPLACED IN BOTH DIRECTIONS (b) AND THE COORDINATED UNINFLUENCED RESULT COEFFICIENTS $\underline{\tilde{X}}$

FIG. 7

BLOCK DIAGRAM FOR THE PATTERN COMPARISON WITH NON-LINEAR TRANSLATION-INVARIANT TRANSFORMATIONS

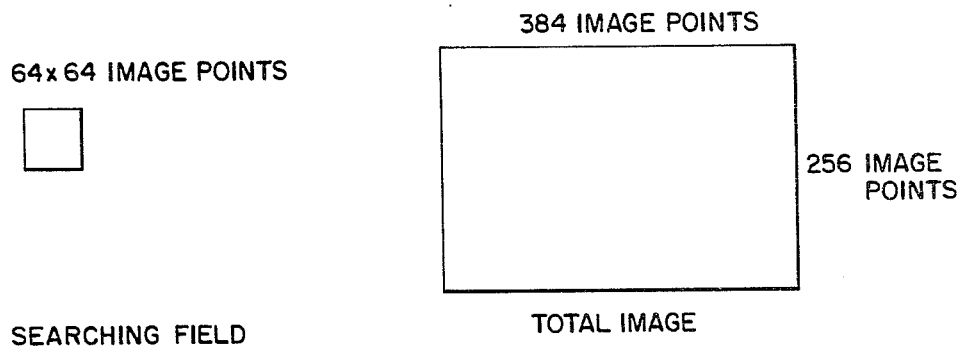
64×64 IMAGE POINTS
384 IMAGE POINTS
256 IMAGE POINTS
SEARCHING FIELD
TOTAL IMAGE
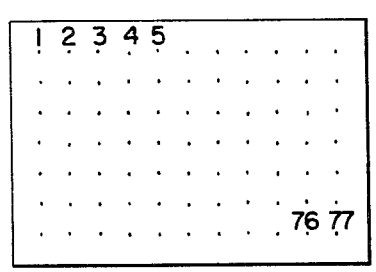
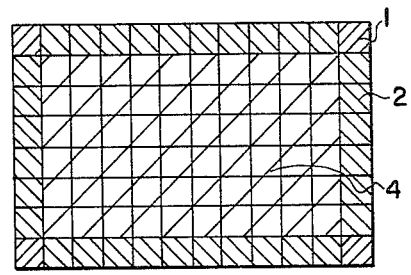
CENTERS OF 77 SEARCHING FIELDS
OVERLAPPING FREQUENCY OF THE SEARCHING FIELDS
EXAMPLE FOR A SEARCHING FIELD DIVISION WITH 77 SEARCHING FIELDS
*FIG. 9*

EXAMPLE FOR A SEARCHING FIELD DIVISION WITH 15 SEARCHING FIELDS

COEFFICIENTS OF THE PATTERN TO BE DETECTED AND COEFFICIENTS OF THE TRANSFORMED PATTERN

ACTUAL TOTAL IMAGE OR PICTURE WITH 15 OVERLAPPING SEARCHING FIELDS

```
12    8    5    11   14
14   13    0     0   13
13   10    6     6   10
```

DISTANCE MATRIX OF THE 15 SEARCHING FIELDS

```
0    0    0    0    0

0    0    1    1    0

0    0    0    0    0
```

DECISION MATRIX OF THE 15 SEARCHING FIELDS

THE PATTERN SOUGHT IS POSITIONED IN THE JOINT AREA OF SEARCHING FIELD 8 AND SEARCHING FIELD 9

SEARCHING FIELD RESULTS AND POSITION DETERMINATION

PROCESS FOR AUTOMATIC PATTERN EVALUATION WITH THE AID OF A RAPID IMAGE PROCESSING AND CIRCUIT FOR CARRYING OUT THE PROCESS

The present invention relates to a process for automatic pattern evaluation, particularly aerial photograph evaluation, with the aid of a rapid image processing and to a circuit for carrying out the process.

An image processing with the object of a pattern recognition is carried out as a rule on the basis of a digitalized planar representation of the object to be classified.

Produced by the object by means of a converter (sensor) is a pattern structured in a planar fashion (for example, an image is converted line by line by means of a video camera into a video signal) and quantified for the further digital processing (for example, a video signal is digitalized by an A/D converter).

The image having been pre-processed in this manner is stored in an image-storing device. Necessary for the recognition of a target is the comparison with a sample image. This comparison may be carried out according to one of the methods enumerated below which will be explained in further detail hereinafter a direct image comparison,
an image comparison with the aid of linear transformations (for example the Fast Fourier Transform, Walsh-Hadamard transformation),
an image comparison with the aid of nonlinear transformations (for example R-transformation, M-transformation).

The simplest and at the same time the slowest process is the direct comparison of image points or scanning spots in every position.

This is effected in known manner with the aid of the cross-correlation function in which the similarly indicated image points of the actual image or picture and those of the sample image are multiplied and the sum formed therefrom. If only a translatory shifting of the target is taken into account—but not a twisting or scale variation—each point of the actual image or picture must be compared with each point of the sample image or picture. For $N \times N$ image points, $N^4$ multiplications and $\approx N^4$ additions will then be required for the formation of the cross-correlation function.

As a result, the cross-correlation maximum indicates the degree of the conformity of the two images and the position of the target.

The high expenditure required for the direct image comparison may be reduced by the introduction of transformations. Best known is the Fourier Transform. After the transformation into the Fourier plane, the Fourier coefficients of the respective frequencies are multiplied with each other and the result is re-transformed. Obtained as in the case of the direct image comparison is the cross-correlation function (cross-correlation maximum and position of the target), but under certain circumstances with fewer calculations.

For $N \times N$ image points, $7 N^3$ multiplications and $7 N^3$ additions are needed.

As compared to the normal Fourier Transform, the Fast Fourier Transform (FFT) is considerably faster due to the fact that conditions of symmetry are used. The speed difference increases progressively faster with a growing number of points of support. Needed in the two dimensional processing for $N \times N$ image points are $6 N^2$ ld $N + N^3$ multiplications and the same number of additions.

Because the fundamental structure of the FFT is typical also for other fast transformations, it will not be considered in detail herein.

Transformations may be represented in the form of matrices. By separating the transformation matrix, which is fully occupied as a rule, into a product of several (ld N) matrices, it is possible to employ matrices with a preponderance of zeroes.

Necessary for an example with 16 input quantities are for each matrix only 16 multiplications and 16 additions. The FFT may be represented for this example as a 4-stage graph. The number of stages ($N_{stages}$) increases only slowly in dependence upon the number of inputs ($N_{inputs}$) according to the law $$N_{stages} = \log_2 (N_{inputs}),$$

in our example therefore $N_{stages} = \log_2 (16) = 4$.

In addition to being suitable for the fast calculation or computation of the cross-correlation function, the Fourier Transform is suitable also for the feature extraction. With the limitation to the amounts of a few Fourier coefficients, the image or picture comparison then will be carried out in a reduced feature space so that there is no longer a need to re-transform into the image or picture area. It is true, however, that the information for the calculation of the position of the target is lost thereby. The selection of the coefficients (features) which are important for the recognition of the target presupposes statistical analyses of the specific properties of the targets (for example by means of the Karhunen-Loeve transformation).

The modified Walsh-Hadamard transformation (MWHT) belongs to the group of the orthogonal and linear transformations for which there exists a fast algorithm, similarly to the Fast Fourier Transform (FFT). This algorithm is even more favorable from the point of view of calculation technique than it is for the FFT because it no longer contains any trigonometric terms and is instead binary-or ternary-valent.

The respective structures again may be represented well as a graph. This type of transformations was and is developed chiefly in the interest of reducing the channel width and for increasing the freedom from interference during the data transmission. Aside from that, it is suitable also for the feature extraction. This is true particularly for the performance spectrum of the MWHT whose calculation belongs to the non-linear transformations. The modified Walsh-Hadamard transformation (MWHT) is similar to the Fast Fourier Transform (FFT), but the graph of the MWHT is only half the size of the graph of the FFT.

This refers initially only to the one-dimensional processing because the transformation for the two-dimensional processing (complete picture) is not yet developed.

The R-transformation belongs to the non-linear transformations whose significance resides substantially in the transformation of the image data into the image room or area. The otherwise customary possibility for the re-transformation is intentionally omitted herein.

The non-linear transformations (performance spectrum of the MWHT, R-transformation and M-transformation) have the following in common:

(a) a fast processing graph with ld N processing stages. The stages also may be identical, whereby the output data are again guided to the input of the graph. Hence it is possible to realize an N-stage graph by means of one stage which is traversed N times.

(b) A number of very simple connections which contain essentially only additions, subtractions, and sum formation. Given thereby is also the possibility of the integer processing (fixed-point computation) because, in contrast to multiplications, the change of the order of magnitude is small here. In the M-transformation which refers exclusively to binary data, logical operators are employed as connecting elements.

(c) The significant property that they are invariant with respect to cyclic permutations. The last-mentioned property means that the transformations supply structurally specific features which are independent of the position. This means that the comparison takes place with a single reference pattern and that the comparison with patterns which are displaced only translatorily is totally eliminated. This property of the translation invariance can be met only by non-linear transformations.

The comparison between image and pattern refers to a few important features which are freely selectable. The selection of the respective features takes place off-line empirically or with the aid the Karhunen-Loeve transformation. This means that effected within the feature space is a cluster analysis which recognizes the significance of the features on the basis of their distinguishability (variance).

Due to the classification with the aid of a few features or characteristics, the storage space for the reference pattern may be minimized.

It is the object of the present invention to carry out automatic evaluations of one- and two-dimensional data quantities rapidly, reliably, and with little expenditure, whereby the evaluation process is concentrated on essential form informations, and decisions may be made with the aid of a classification within the feature space.

According to the present invention, this object is obtained for the one-dimensional data processing by virtue of the fact that the digitalized data are used as input quantity for the following transformation:

$$x_{2i}^{(r+1)} = f_1(x_i^{(r)}, x_{i+N/2}^{(r)})$$
$$x_{2i+1}^{(r+1)} = f_2(x_i^{(r)}, x_{i+N/2}^{(r)})$$

$$\Big|_{i=0}^{N/2-1} \quad r = 0, 1, \ldots, n-1; \quad N = 2^n,$$

$$x^{(0)} = x, \tilde{x} = x^{(n)}$$

wherein x is the original pattern $\tilde{x}$ is the transformed pattern $N = 2^n$ is the dimension of x r is the number of the processing step n is the quantity of the processing steps $f_1(A,B)$ is the Boolean and-connection A ∧ B (bitwise)

$f_2(A,B)$ is the Boolean or-connection A ∨ B (bitwise)

signify that some structurally specific result coefficients of this transformation are selected with the aid of a known classification, whereby the comparison between the pattern and the actual data set is made on the basis of the selected coefficients, that the criterion for the similarity of two patterns is a distance measurement in the form of a numerical value, for example the Eucledian distance, and that the decision concerning the presence in the actual data set of the pattern being sought is made with the aid of a threshold value interrogation.

According to the present invention, the afore-mentioned object is obtained for the two-dimensional data processing (image processing) by virtue of the fact that produced by means of a copying or imaging sensor with subsequent analog-digital conversion is a digitalized image or picture which is used as input quantity for the following transformation:

$$x_{2i,2j}^{(r+1)} = f_1[f_1(x_{i,j}^{(r)}, x_{i+N/2,j}^{(r)}), f_1(x_{i,j+N/2}^{(r)}, x_{i+N/2,j+N/2}^{(r)})]$$
$$x_{2i+1,2j}^{(r+1)} = f_1[f_2(\ldots, \ldots), f_2(\ldots, \ldots)]$$
$$x_{2i,2j+1}^{(r+1)} = f_2[f_1(\ldots, \ldots), f_1(\ldots, \ldots)]$$
$$x_{2i+1,2j+1}^{(r+1)} = f_2[f_2(\ldots, \ldots), f_2(\ldots, \ldots)]$$

$$\Big|_{j=0}^{N/2-1} \Big|_{i=0}^{N/2-1}$$

$$r = 0, 1, \ldots, n-1; N = 2^n$$
$$x^{(0)} = x, \tilde{x} = x^{(n)}$$

wherein x is the original pattern $\tilde{x}$ is the transformed pattern $N = 2^n$ is the dimension of x r is the number of the processing step n is the quantity of the processing steps $f_1(A,B)$ is the Boolean and-connection A ∧ B (bitwise)

$f_2(A,B)$ is the Boolean or-connection A ∨ B (bitwise)

signify that some structurally specific result coefficients of this transformation are selected with the aid of a known classification, whereby the comparison between pattern and actual image is made on the basis of the selected coefficients, that the criterion for the similarity of two patterns is a distance measurement in the form of a numerical value, for example the Eucledian distance, and that the decision concerning the presence in the image of the pattern being sought is made with the aid of a threshold value interrogation.

The advantages of the present invention reside in reducing the hardware expenditure and the calculating time. With the realization of the above-mentioned inventive transformation by a highly integrated building block which contains only elements of the single bit processing, it is possible to prove, for example for an image with 256×256 image points, a reduction in expenditure by more than the factor 100 as compared to the cross-correlation function with the aid of the Fast Fourier Transform. A genuine time realization referred to 25 images per second is achievable.

An elucidating illustration of the inventive one- and two-dimensional transformation process will be further described hereinafter based on the accompanying drawings, wherein FIG. 1 is a signal flux diagram of the inventive one-dimensional transformation;

FIG. 6 illustrates one example for a binary pattern;

FIG. 7 illustrates one example for a grey-stage pattern;

FIG. 9 illustrates an example for a searching field division with 77 searching fields;

Figure 1:
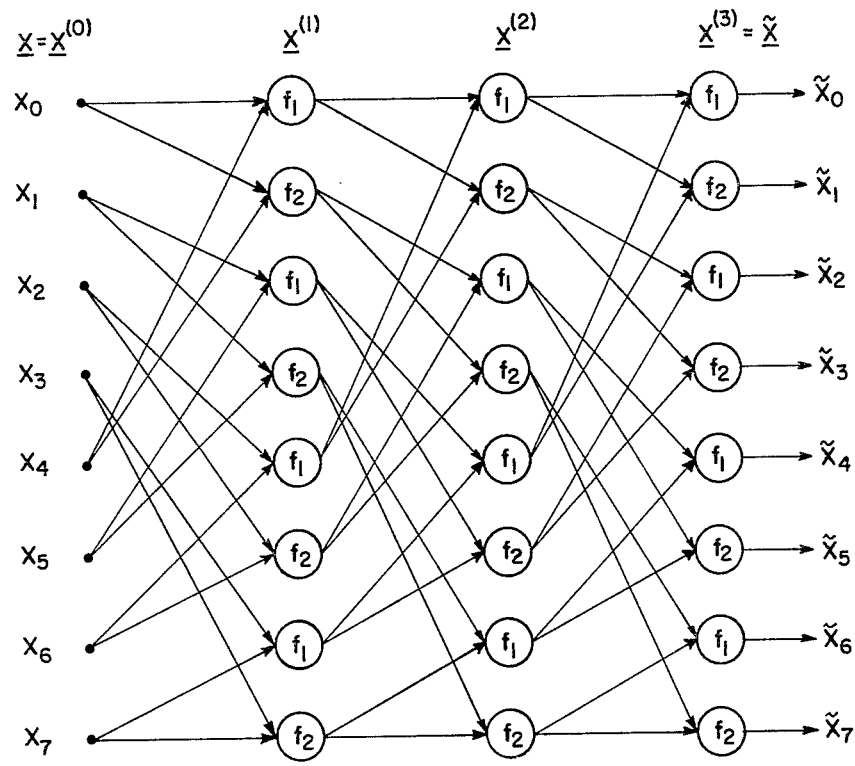
Figure 2:
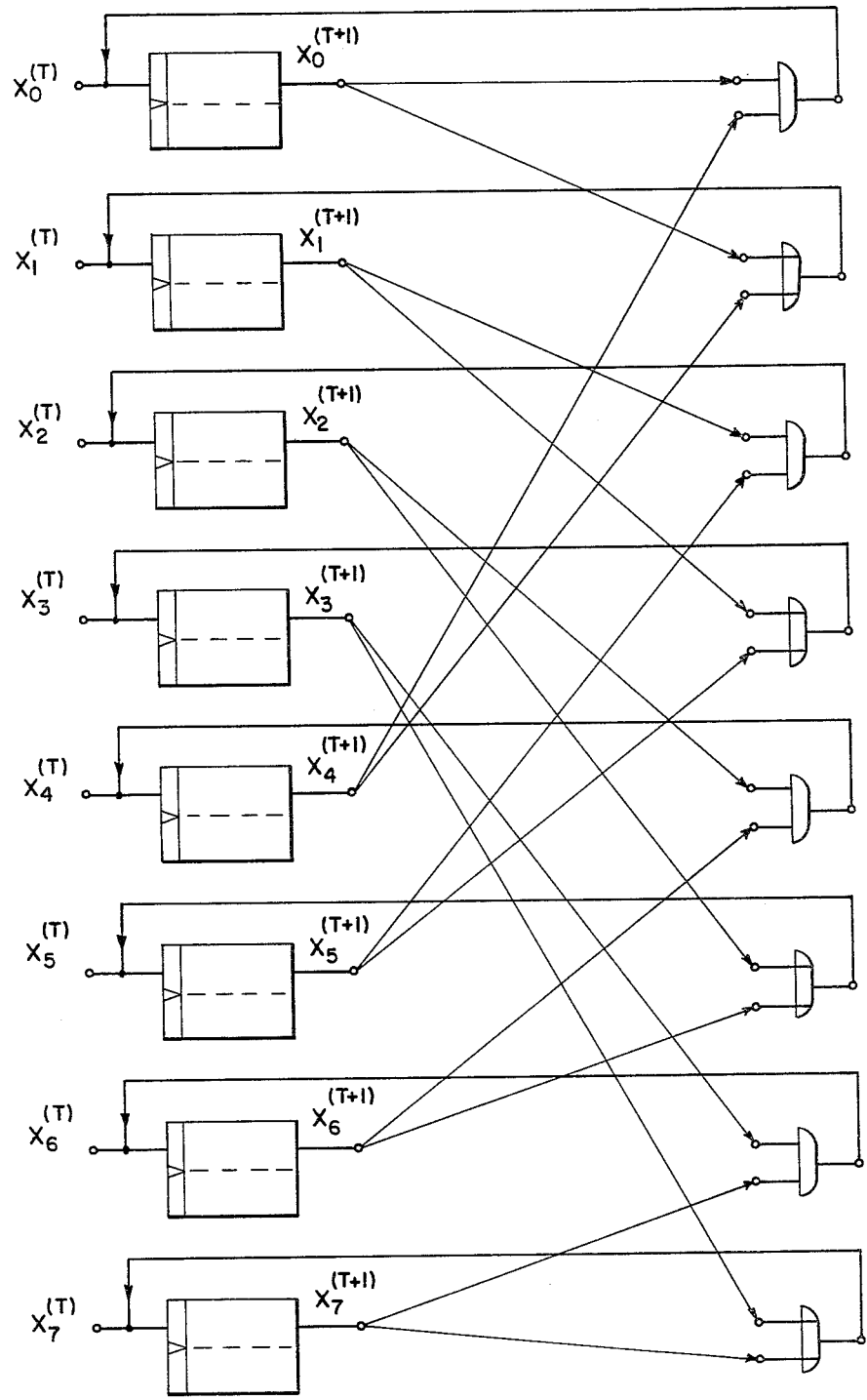
FIG. 2 is a wiring diagram of the inventive one-dimensional transformation.
Figure 3:
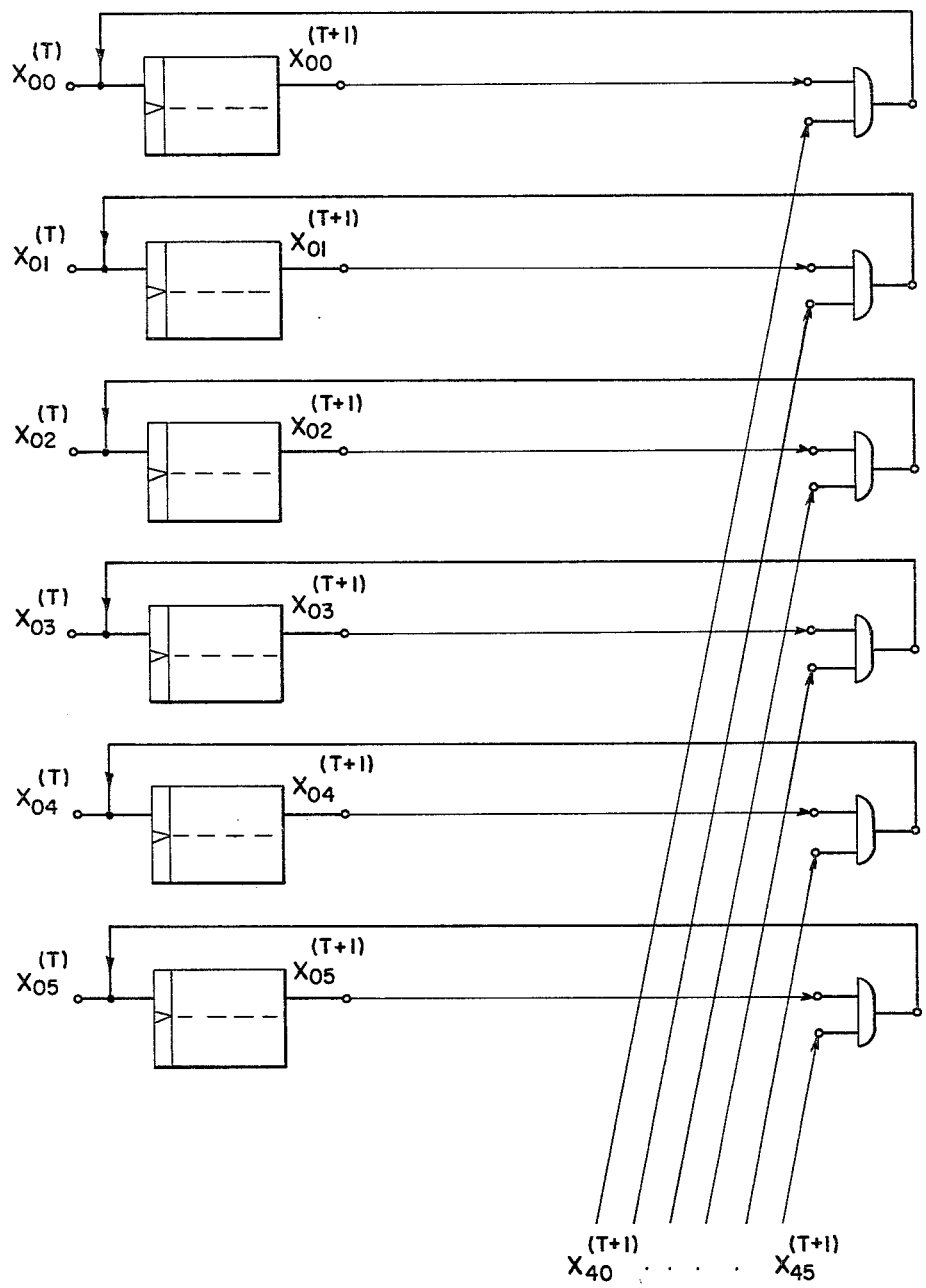
FIG. 3 is a wiring diagram of the connection of two pattern elements with a resolution of 6 bits.

The inventive one- and two-dimensional transformation serves for the characterization of essential form informations independently of an accidental displacement. The one-dimensional transformation refers to the processing of one-dimensional data quantities, for example measuring data as a function of the time in technical and medical fields of application. A signal flux diagram executed for 8 pattern elements is illustrated in FIG. 1, whereby each arrow corresponds to one vector with a resolution of m bits. The 8 pattern elements $x_0$-$x_7$ are processed by $\log_2 (8)=3$ identical stages. The transformed coefficients $x_0$-$x_7$ also may be obtained when the same stage is run through three times. This becomes apparent from the wiring diagram in FIG. 2. The connection indicated therein contains as many storage cells and gates as pattern elements when purely binary patterns (resolution 1 bit) are considered. In grey-stage patterns with N pattern elements and a resolution of m bits, the expenditure increases to N·m storage cells and gates. The wiring diagram of the connection of two pattern elements with a resolution of m=6 bits is illustrated in FIG. 3. In N=8 pattern elements with respectively m=6 bits, 48 storage cells and gates are therefore required. The time consumption by the connection network amounts per revolution to merely one gate switching time.

Figure 4:
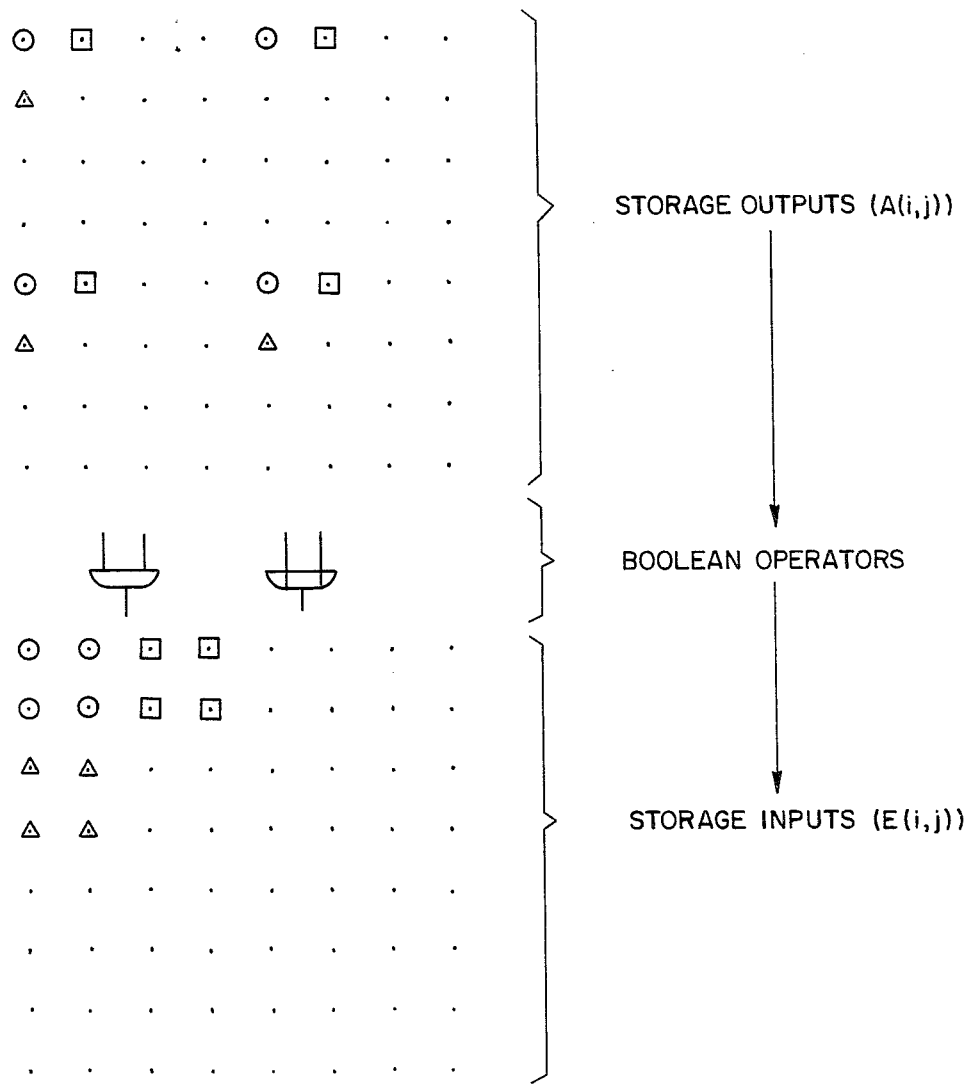
FIG. 4 is a basic signal flux diagram of the inventive two-dimensional transformation.

The two-dimensional transformation refers to the image evaluation in technical, commercial, and medical areas. Because a graphic representation of the complete signal flux diagram for the two-dimensional transformation would be totally unclear, only the coefficient correlations will be initially explained herein. Apparent from the basic signal flux diagram in FIG. 4 is the mathematical law, whereby in this case a picture or image with $8 \times 8$ coefficients was used as the basis. According to the afore-indicated general transformation equations, the storage outputs A (i, j) are connected by a logical connection network with the storage inputs E (i, j).

Figure 5:
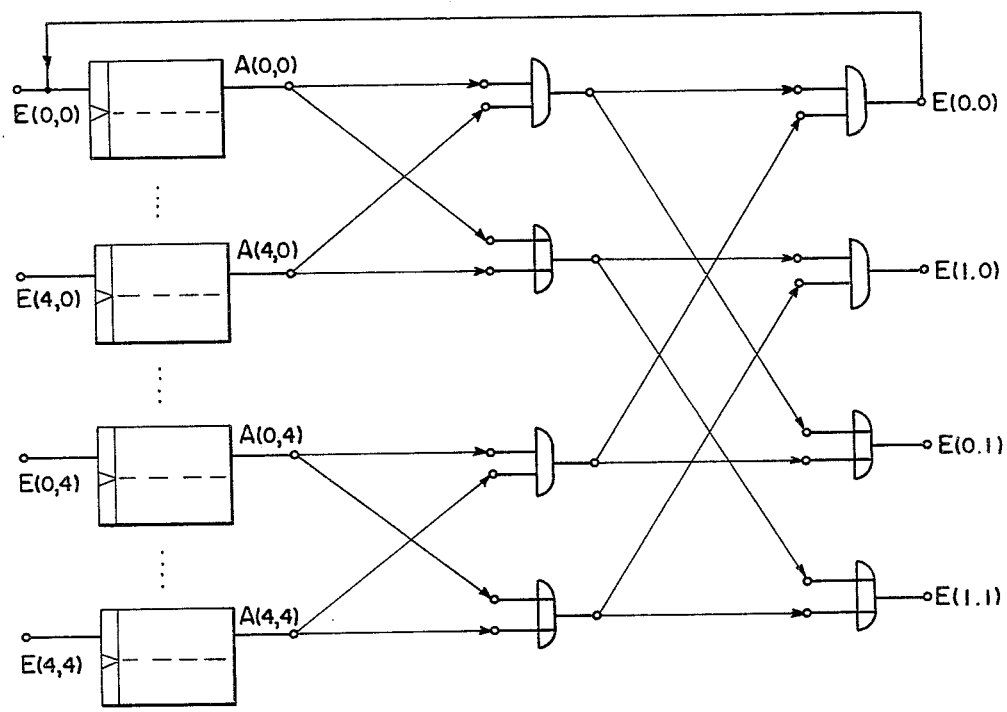
FIG. 5 illustrates a part of the wiring diagram of the inventive two-dimensional transformation.

The coefficients A (0,0), A (4,0), A (0,4), A (4,4) shown as circles are connected with the coefficients E (0,0), E (1,0), E (0,1), E (1,1) which also are designated by circles. The same holds true for the coefficients which are characterized by rectangles and triangles. The mathematical law of the connection network is apparent from FIG. 5 in which a part of the wiring diagram is shown.

As compared to the one-dimensional transformation, the number of storage cells per pattern has remained the same, whereas the number of gates has doubled. For $N \times N = 8 \times 8 = 64$ pattern elements having respectively $m=6$ bits, 384 storage or memory cells and 768 gates are therefore needed. The time consumption by the connection network amounts per revolution to two gate switching times.

Examples for the translation invariance of the inventive transformation are illustrated in FIG. 6 for a binary pattern and in FIG. 7 for a grey-stage pattern. The transformed coefficients are respectively uninfluenced by the displacement.

A specific embodiment according to the present invention will now be further described hereinafter on the basis of FIGS. 8 to 14 of the accompanying drawings.

Figure 8:
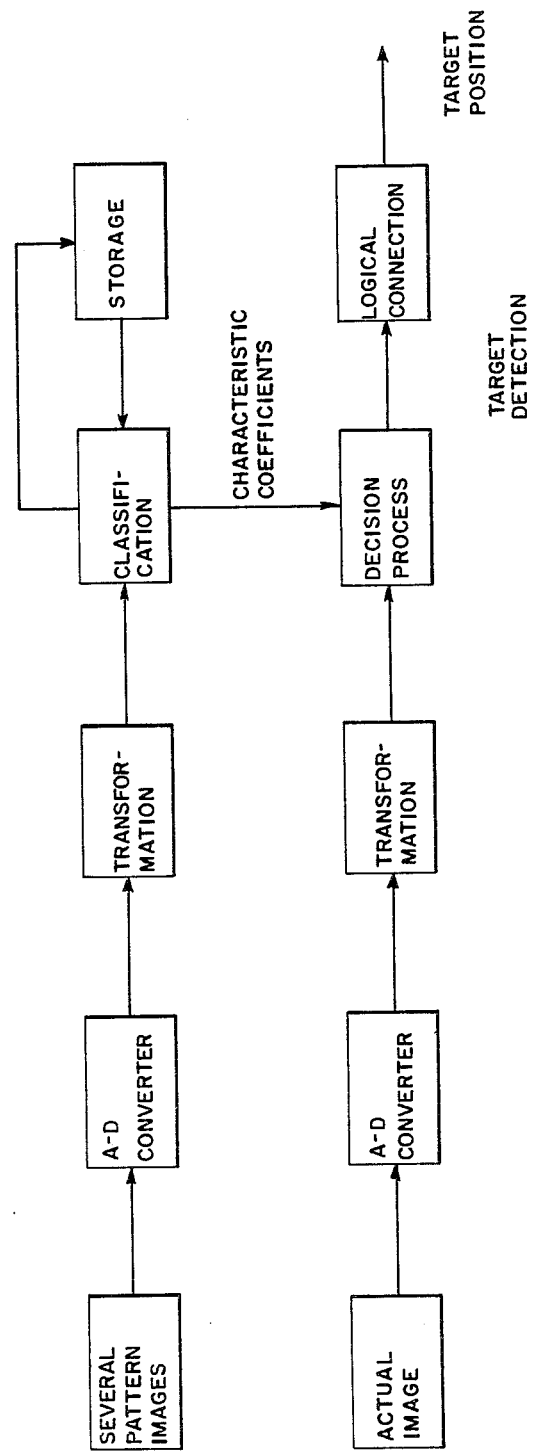
FIG. 8 is a block diagram for the pattern comparison with non-linear translation-invariant transformations.
Figure 10:
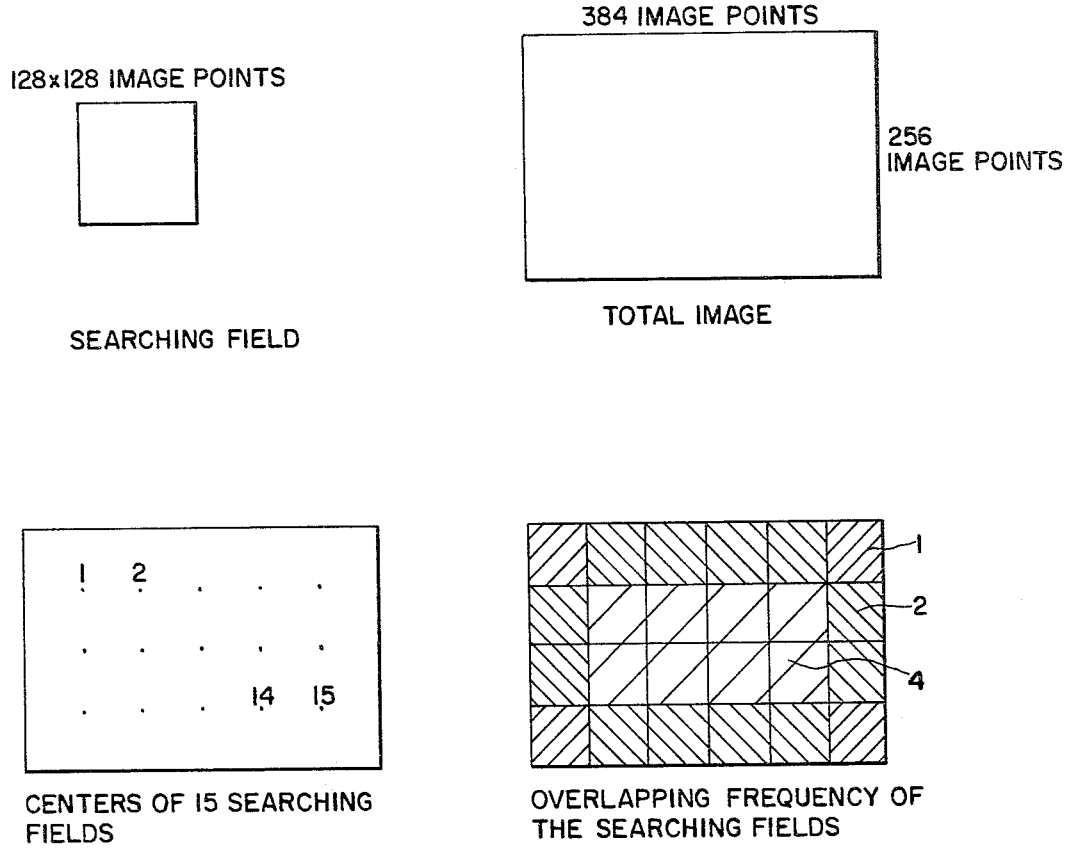
FIG. 10 illustrates an example for a searching field division with 15 searching fields.

The inventive process serves for the recognition and position determination of patterns to be detected in one- and two-dimensional data quantities. This is to be further explained on the basis of an image processing example. The procedure is valid for all non-linear translation-invariant transformations and is illustrated in FIG. 8 as a block diagram.

Three phases are distinguished:
1. Transformation and classification with the aim of selecting characteristic coefficients;
2. transformation and coefficient comparison with the aim of deciding with respect to the pattern detection;
3. logical connection of the decision of the individual searching fields with the aim of determining the position of the pattern being sought.

Re. 1. The selection of the coefficients takes place off-line in most cases of application so that also expenditure-involving classification algorithms may be employed. These are of advantage particularly in the case of aerial pictures when there are present in the pattern image or picture—aside from the pattern structure being sought—also other structures which impair the recognizability of the characteristic, structurally specific coefficients of the pattern being sought.

Re. 2. After the analog-digital conversion, the actual image or picture is transformed according to the previously determined searching field division. Two examples for searching field divisions are apparent from FIGS. 9 and 10. In the searching field division of FIG. 10, 15 transformations with, respectively, $128 \times 128$ image points must accordingly be carried out. Thereafter, the selected pattern coefficients are compared with the coordinated result coefficients of all searching fields in that a distance measurement is calculated. When the calculated distance is below a previously determined threshold value, the pattern being sought is within the respective searching field to which a 1 then will be coordinated. If it is not, a 0 will be coordinated to the searching field. In the decision matrix thus calculated, only the figures 0 and 1 will thus occur.

Re. 3. For purposes of the position determination the decision matrix is evaluated, and several cases must be distinguished.

(a) Only one 1 is present:
   The target field or area is the complete coordinated searching field;
(b) several neighboring 1 are present:
   The target field or area is the overlapping area or zone of the coordinated searching fields;
(c) several non-neighboring 1 are present:
   The result is rejected, or several target fields or areas are determined in case several like patterns in the image or picture are expected.

The operation according to the present invention will now be explained hereinafter on the basis of one specific example with binary patterns.

Figure 11:
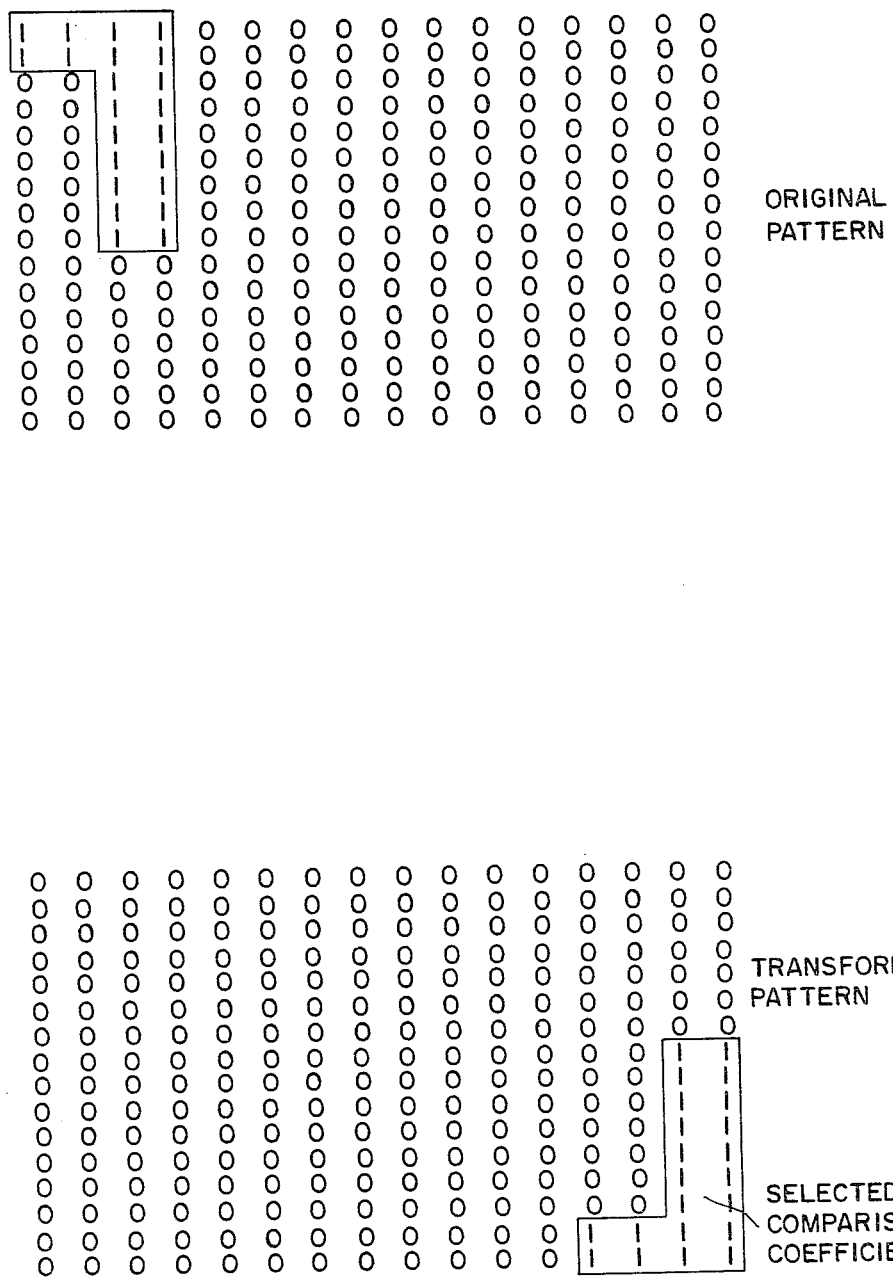
FIG. 11 illustrates the coefficients of the pattern to be detected and the coefficients of the transformed pattern.
Figure 12:
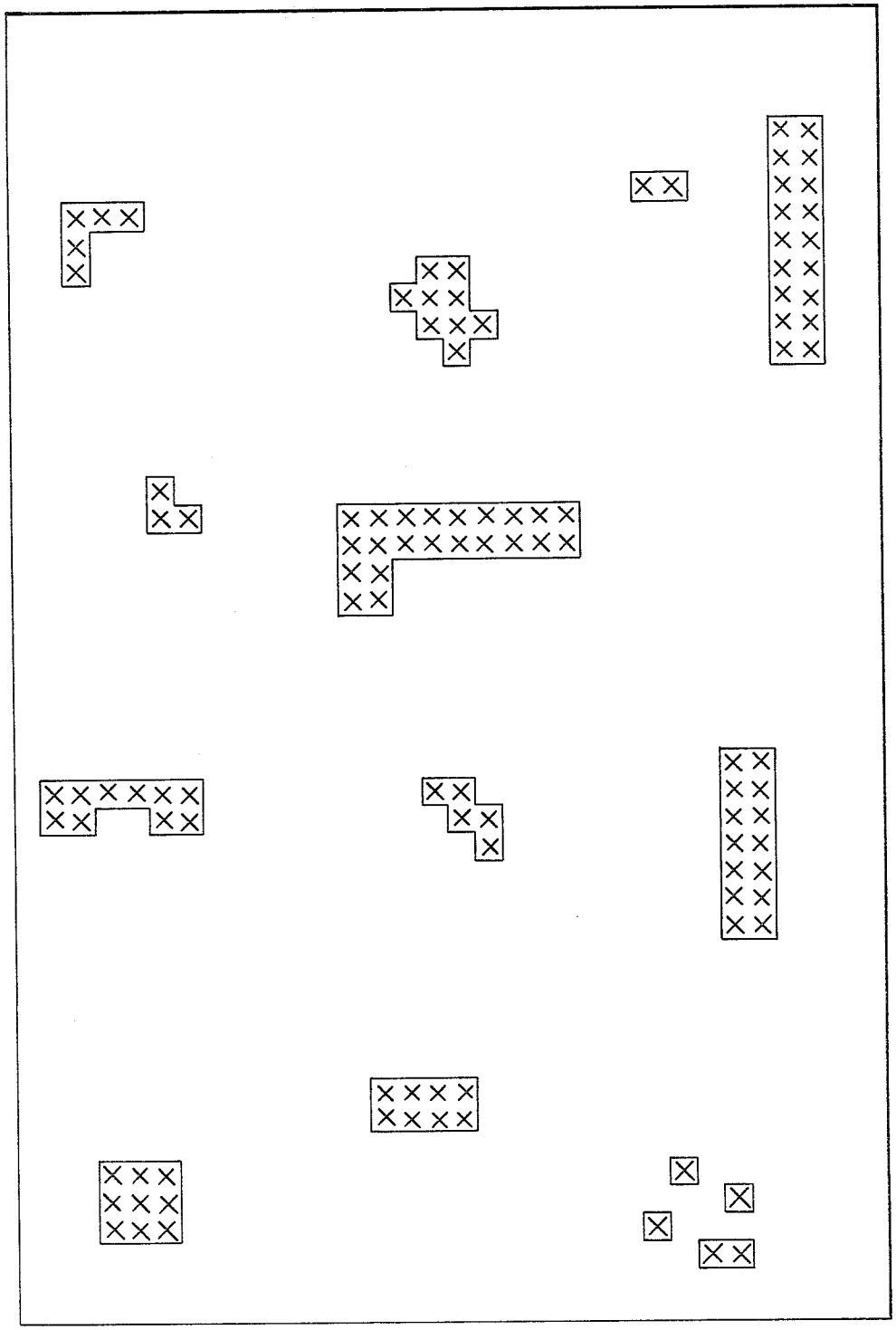
FIG. 12 illustrates the actual total image or picture.
Figure 13:
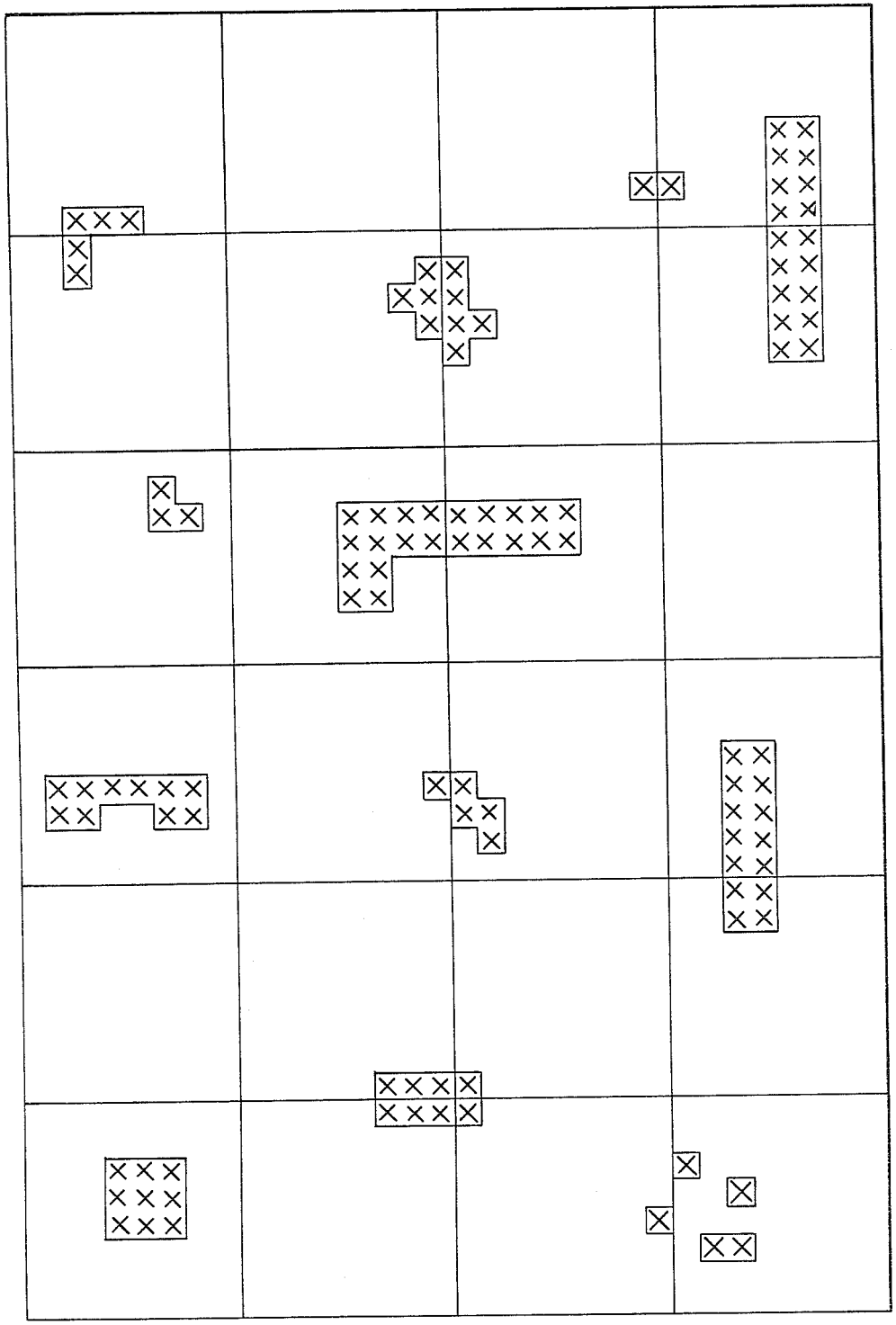
FIG. 13 illustrates the actual total image with 15 overlapping searching fields.

The first phase is apparent from FIG. 11, and represented therein are the pattern to be detected, the transformed pattern, and the selected comparison coefficients. In the second phase, the actual total image or picture in FIG. 12 is to be examined as to the presence of the pattern being sought. The division of the actual pattern into 15 respectively overlapping searching fields is apparent from FIG. 13. The subsequently calculated distance matrix as well as the decision matrix are shown in FIG. 14.

Figure 14:
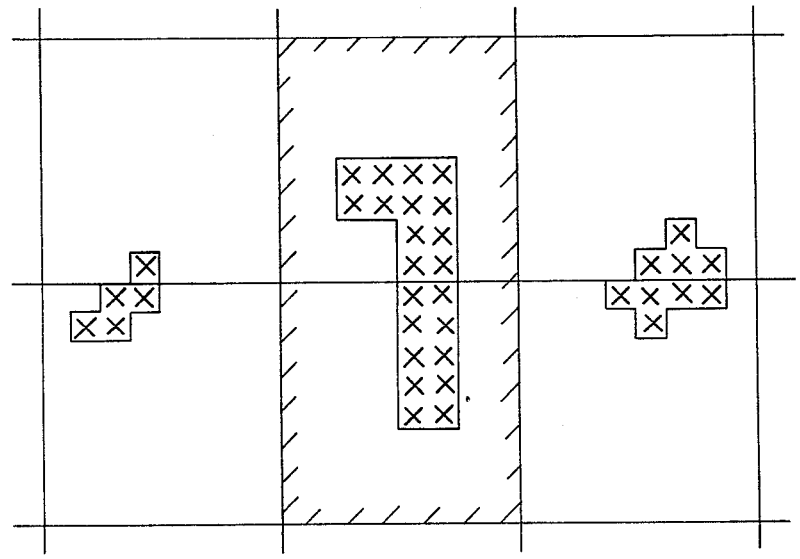
FIG. 14 illustrates the searching field results and the position determination.

The result of the third phase is also shown in FIG. 14. The target field or area (shown shaded) is the joint area of the searching field 8 and the searching field 9.

It will be obvious to those skilled in the art that many modifications may be made within the scope of the present invention without departing from the spirit thereof, and the invention includes all such modifications.

What is claimed is:

1. A circuit for implementing a process for one-dimensional automatic pattern evaluation, particularly measuring data evaluation in technical and medical fields of application, with the aid of a rapid image processing,
   which comprises employing digitalized data as input quantity for the following transformation:

$$x_{2i}^{(r+1)} = f_1(x_i^{(r)}, x_{i+N/2}^{(r)})$$
$$x_{2i+1}^{(r+1)} = f_2(x_i^{(r)}, x_{i+N/2}^{(r)})$$
$$\begin{vmatrix} N/2 - 1 \\ \\ \\ i = 0 \end{vmatrix} \quad r = 0, 1, \ldots, n - 1 \\ N = 2^n,$$

$$x^{(0)} = x, \; \tilde{x} = x^{(n)}$$

wherein
x is the original pattern
$\tilde{x}$ is the transformed pattern
$N = 2^n$ is the dimension of x
r is the number of the processing step
n is the quantity of the processing steps
$f_1(A,B)$ is the Boolean AND connection $A \wedge B$ (bitwise)
$f_2(A,B)$ is the Boolean OR connection $A \vee B$ (bitwise) to signify that some structurally specific result coefficients of this transformation are selected with the aid of a known classification,
whereby the comparison between the pattern and the actual data set is made on the basis of the selected coefficients,
that the criterion for the similarity of two patterns is a distance measurement in the form of a numerical value, for example the Eucledian distance, and
making the decision concerning the presence of the pattern being sought in the actual data set with the aid of a threshold value interrogation, said circuit comprising means connecting storage elements and AND/OR gates, each word being resolved into its individual bits which are processed sequentially separately and in parallel, and where for n pattern points (words) with a resolution of m bits in each case there are present a total of m·n one-bit memories (flip-flops) and ½m·n OR gates and ½m·n AND gates.

2. A circuit for implementing a process for two-dimensional pattern evaluation, particularly aerial picture evaluation as well as general image or picture evaluation in technical, commercial, and medical fields, with the aid of a rapid image processing,
   which comprises producing a digitalized image by means of an imaging sensor with subsequent analog-digital conversion which is used as input quantity for the following transformation:

$$x_{2i,2j}^{(r+1)} = f_1[f_1(x_{i,j}^{(r)}, x_{i+N/2,j}^{(r)}), f_1(x_{i,j+N/2}^{(r)}, x_{i+N/2,j+N/2}^{(r)})]$$
$$x_{2i+1,2j}^{(r+1)} = f_1[f_2(\cdot, \cdot, \cdot), f_2(\cdot, \cdot, \cdot)]$$
$$x_{2i,2j+1}^{(r+1)} = f_2[f_1(\cdot, \cdot, \cdot), f_1(\cdot, \cdot, \cdot)]$$
$$x_{2i+1,2j+1}^{(r+1)} = f_2[f_2(\cdot, \cdot, \cdot), f_2(\cdot, \cdot, \cdot)]$$
$$\begin{vmatrix} N/2 - 1 \\ \\ \\ \\ j = 0 \end{vmatrix} \begin{vmatrix} N/2 - 1 \\ \\ \\ \\ i = 0 \end{vmatrix}$$

$$r = 0, 1, \ldots, n - 1; N = 2^n$$
$$x^{(0)} = x, \; \tilde{x} = x^{(n)}$$

wherein
x is the original pattern
$\tilde{x}$ is the transformed pattern
$N = 2^n$ is the dimension of x
r is the number of the processing step
n is the quantity of the processing steps
$f_1(A,B)$ is the Boolean AND connection $A \wedge B$ (bitwise)
$f_2(A,B)$ is the Boolean OR connection $A \vee B$ (bitwise) to signify that some structurally specific result coefficients of this transformation are selected with the aid of a known classification,
whereby the comparison between pattern and actual image is made on the basis of the selected coefficients,
that the criterion for the similarity of two patterns is a distance measurement in the form of a numerical value, for example the Eucledian distance, and
making the decision concerning the presence of the pattern sought in the image with the aid of a threshold value interrogation, said circuit comprising means connecting storage elements and AND/OR gates, each word being resolved into its individual bits which are processed separately and in parallel, and where for m·n pattern points (words) with a resolution of m bits in each case there are present a total of 2·n·n·m one-bit memories (flip-flops) and n·n·m OR gates and n·n·m AND gates.

* * * * *

UNITED STATES PATENT AND TRADEMARK OFFICE
CERTIFICATE OF CORRECTION

PATENT NO. : 4,254,399
DATED : March 3, 1981
INVENTOR(S) : Hans Burkhardt; Walter Metzdorff; and Holger Schütte It is certified that error appears in the above—identified patent and that said Letters Patent is hereby corrected as shown below:

The following information has been omitted from the patent:

30  Foreign Application Priority Data
March 25, 1978 (DE)   Fed. Rep. of Germany . . . . 2813157

Signed and Sealed this

Second Day of June 1981

[SEAL]

Attest:

RENE D. TEGTMEYER

Attesting Officer

Acting Commissioner of Patents and Trademarks